United States Patent [19]

Phillips et al.

[11] Patent Number: 4,811,491

[45] Date of Patent: Mar. 14, 1989

[54] TWO-AXIS DIFFERENTIAL CAPACITANCE INCLINOMETER

[75] Inventors: Alan C. Phillips, Los Altos; Terence J. O'Brien, San Jose, both of Calif.

[73] Assignee: Etak, Inc., Menlo Park, Calif.

[21] Appl. No.: 93,017

[22] Filed: Sep. 4, 1987

[51] Int. Cl.$^4$ .............................................. G01C 9/06
[52] U.S. Cl. ...................................... 33/366; 340/689; 364/559
[58] Field of Search ..................... 33/366; 340/689; 364/559; 361/284

[56] References Cited

U.S. PATENT DOCUMENTS

| | | | |
|---|---|---|---|
| 2,711,590 | 6/1955 | Wilcox | 33/366 |
| 2,936,411 | 5/1960 | Doty | 33/366 X |
| 3,290,786 | 12/1916 | Parkin | 33/366 X |
| 3,487,303 | 12/1969 | Remington | 33/366 X |
| 4,528,760 | 7/1985 | Plummet | 33/366 |

Primary Examiner—William D. Martin, Jr.
Attorney, Agent, or Firm—Fliesler, Dubb, Meyer & Lovejoy

[57] ABSTRACT

A two-axis inclinometer having a central electrically conductive member inserted within and spaced from the interior walls of a non-electrically conductive vessel. A plurality of four plates are mounted symmetrically on the exterior surface of the vessel. A dielectric fluid is provided in the gap between the center member and the interior wall of the vessel so as to provide a differential change in the capacitance between opposite plate members as the inclinometer is tilted about an axis perpendicular to its longitudinal axis.

1 Claim, 1 Drawing Sheet

TWO-AXIS DIFFERENTIAL CAPACITANCE INCLINOMETER

BACKGROUND OF THE INVENTION

1. Field of the Invention

The present invention relates to inclinometers in general and in particular to a two-axis inclinometer comprising four capacitor plates separated from a common capacitor plate by a gap partially filled with a dielectric fluid.

2. Description of the Prior Art

Inclinometers provide accurate measurements of rotation about one or more horizontal axes. The primary output is typically an analog voltage which is proportional to the tilt position of the inclinometer relative to the horizontal axes. Some types of inclinometers comprise a pendulum. Others comprise a capacitor separated by a dielectric liquid. Typically, prior known inclinometers are single-axis devices, i.e. duplicate sensing units are required in order to obtain an input about two orthogonal axes.

SUMMARY OF THE INVENTION

The present invention comprises a two-axis inclinometer. In a preferred embodiment there is provided a pair of concentric cylindrical members. The interior member comprises an electrically conductive material. The exterior member comprises a non-electrically conductive material. The interior member is spaced from the exterior member by a gap in which there is provided a dielectric fluid. Symmetrically placed on the outside wall of the exterior member are four capacitor plates.

As the inclinometer is tilted about an axis perpendicular to its longitudinal axis, the dielectric fluid in the gap between one of the plates rises while the dielectric fluid in the gap between the opposite plate and the common member falls. The resulting change in the capacitance between each of the plates and the common member is used for providing an output signal which corresponds to the differential of the capacitance between each of the plates and the common member. A second output signal is generated which corresponds to the differential capacitance between the second pair of plates and the common member as the inclinometer is tilted about the orthogonal axis. A principal advantage of the present invention is that a minimum amount of apparatus is required to obtain information concerning tilts about two orthogonal axes.

BRIEF DESCRIPTION OF THE DRAWINGS

The above and other objects, features and advantages of the present invention will become apparent from the following detailed description of the accompanying drawing, in which.

DESCRIPTION OF THE PREFERRED EMBODIMENTS

Figure 1:
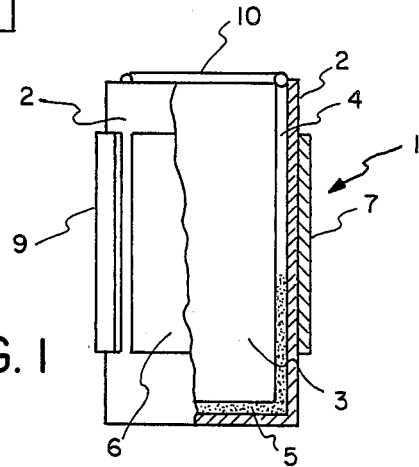
FIG. 1 is a partially cut away elevation view of an embodiment of the present invention.

Referring to FIG. 1, there is provided in accordance with the present invention an inclinometer apparatus designated generally as 1. In the apparatus 1 there is provided a hollow cylindrical non-electrically conductive vessel 2. Inserted in the vessel 2 and concentric therewith there is provided an electrically conductive cylindrical center member 3. The member 3 is spaced from the interior wall of the vessel 2 by means of a gap 4. In the gap 4 there is provided a dielectric fluid 5. Mounted to the exterior wall of the vessel 2 there are provided four electrically conductive plate members 6, 7, 8 and 9. The interior member 3 is kept spaced from the interior walls of the vessel 2 and the dielectric fluid located therebetween is contained within the vessel 2 by means of an O-ring 10.

Figure 2:
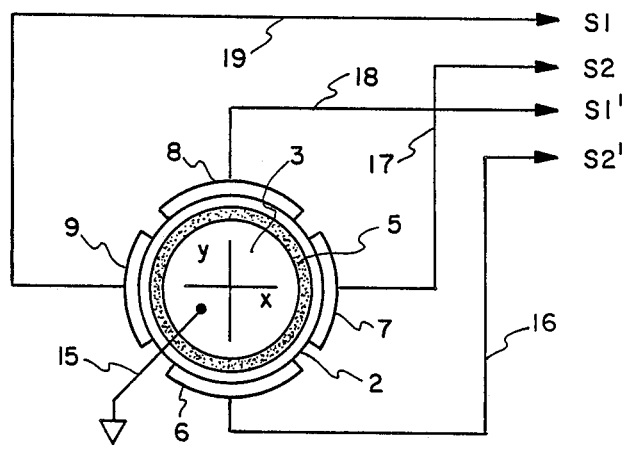
FIG. 2 is is a top plan view of FIG. 1 with the O-ring omitted and electrical conductors connected to the capacitor plate members.

Referring to FIG. 2, the center member 3 is coupled to ground as shown by an electrical line 15. Plates 6, 7, 8 and 9 are coupled to electrical wires 16, 17, 18, 19, respectively.

Figure 3:
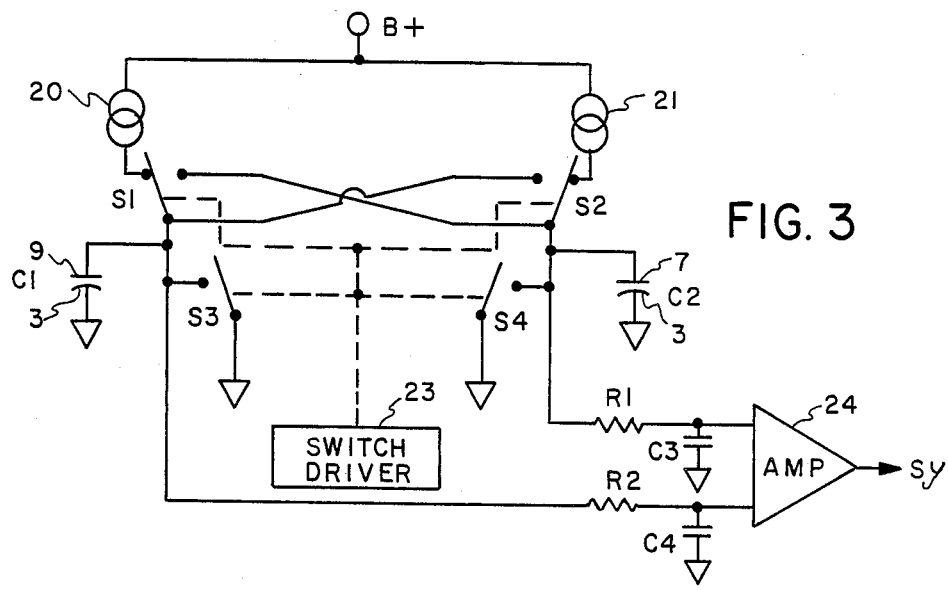
FIG. 3 is a block diagram of a circuit used for providing a differential output from two of the plate members shown in FIG. 2.

Referring to FIG. 3, there is provided an electrical circuit for generating a signal corresponding to the differential capacitance of each of the pairs of orthogonal plates 6–9. As shown in FIG. 3, there is provided a pair of current sources 20 and 21 which are coupled to a source of potential B+ and to a pair of switches S1 and S2. A capacitor C1 comprising the center member 3 and the exterior plate 9 is coupled between the switch S1 and ground. A capacitor C2 comprising the center member 3 and the exterior plate 7 is coupled between S2 and ground. Coupled in parallel with the capacitor C1 there is provided a switch S3. Coupled in parallel with the capacitor C2 there is provided a switch S4. Switches S1, S2, S3 and S4 are opened and closed on a repetitive basis, as will be further described below by a clock-driven switch driver 23. Switches S1 and S2 are further coupled to an amplifier 24 by means of an RC low pass filter circuit R2,C4 and R1,C3, respectively. The output of the amplifier 24 is designated Sy. An identical circuit, not shown, is provided for generating an output signal Sx as a function of the differential change in capacitance between the member 3 and the plates 6 and 8. That is, plates 6 and 8 are coupled to switches S2' and S1' which correspond to switches S1 and S2, respectively.

Typically, the size of the gap between the member 3 and the interior wall of the vessel 2 is approximately 50 mils and the volume of the dielectric fluid inserted therein is such that when the apparatus 1 is tilted at an angle of 45° relative to its longitudinal axis, the fluid extends approximately from the bottom of one of the exterior plates to the top of the opposite exterior plate. For example, referring to FIG. 2, there is shown a pair of orthogonal axes x and y. When the apparatus 1 is tilted 45° relative to the x axis, the dielectric fluid 5 in the gap 4 moves to the bottom of one of the plates 6 and 8 and to the top of the other of the plates 6 and 8. Similarly, when the apparatus 1 is tilted relative to the y axis, the fluid 5 moves to the bottom of one of the plates 7 and 9 and to the top of the other plate 7 and 9.

The change in capacitance resulting from the change in the amount of dielectric fluid located between the plates and the center member 3 is processed in the circuit of FIG. 3 so as to provide an output signal corresponding to the differential capacitance between the orthogonal pairs of plates. Thus, an output signal Sy from the amplifier 24 corresponds to a change in the differential capacitance between the plates 7 and 9 while a corresponding output signal Sx from the companion circuit (not shown) corresponds to a change in the differential capacitance between the plates 6 and 8 as the apparatus 1 is tilted relative to the y and x axes, respectively.

Sensors or transducers often utilize a balanced pair of capacitors that vary differentially. Sometimes a very necessary characteristic of the circuit sensing this differential variation is that it be as insensitive as possible to equal variations (common mode variations) of the two capacitors.

Accordingly, the capacitor C1 and C2 and the corresponding capacitors in the companion circuit (not shown) are repetitively cross-coupled to the current sources 20 and 21 so as to compensate for differences in the current sources 20 and 21 as may occur due to temperature and processing variations in the transistors used therein. Similarly, capacitors C1 and C2 are discharged to ground or other constant potential on a periodic basis by means of switches S3 and S4 and thereafter low pass filtered so as to provide, in conditions of no motion, DC inputs to the amplifier 24; the inputs to the amplifier 24 being a voltage proportional to the inverse of the capacitance measured between the plates and the center member 3. The operation of the switches S1–S4 is provided by a clock in the switch driver 23.

While an embodiment of the present invention is described above, it is contemplated that various modifications may be made thereto without departing from the spirit and scope of the present invention. For example, in an alternative embodiment the plates 6, 7, 8 and 9 can be mounted in the interior of the cylinder 3 and held spaced therefrom by suitable insulating members. Electrical connections thereto may be provided by means of insulated feedthroughs. In this embodiment the need for a separate vessel to contain the dielectric fluid is not required. Accordingly, it is intended that the embodiment described be considered only as an illustration of the present invention and that the scope thereof should not be limited thereto but be determined by reference to the claims hereinafter provided.

What is claimed is:

1. A two-axis inclinometer comprising:
    an electrically conductive member;
    first, second, third and fourth electrically conductive plates;
    means for mounting said first and said second plates adjacent to opposite surfaces of said member so as to provide a gap between said first and said second plates and said member;
    means for mounting said third and fourth plates adjacent to opposite surfaces of said member so as to provide a gap between said third and fourth plates and said member, said first and said second plates being mounted orthogonal to said third and said fourth plates;
    means for retaining a dielectric fluid in said gaps in such a manner that as said member and plates are inclined about a pair of orthogonal axes, the amount of said fluid in each of said gaps will change as a function of the angle of tilt of said member and said plates about said pair of orthogonal axes;
    a pair of current sources for charging opposite ones of said plates relative to said member;
    means for periodically switching said current sources between each of said opposite plates to compensate for variations in current from said sources;
    means for periodically discharging said opposite plates relative to said member, said charging and said discharging producing a pair of sawtooth voltages; and
    means for filtering and differentially amplifying said sawtooth voltages for providing an output signal which is proportional to the inverse of the differential capacitance between said opposite plates and said member as said member and said plates are tilted about said orthogonal axes.

* * * * *